US008286983B2

(12) United States Patent
Hellbusch

(10) Patent No.: US 8,286,983 B2
(45) Date of Patent: Oct. 16, 2012

(54) TRAILER CHASSIS

(76) Inventor: James A. Hellbusch, Columbus, NE (US)

(*) Notice: Subject to any disclaimer, the term of this patent is extended or adjusted under 35 U.S.C. 154(b) by 433 days.

(21) Appl. No.: 12/590,937

(22) Filed: Nov. 17, 2009

(65) Prior Publication Data

US 2011/0115194 A1 May 19, 2011

(51) Int. Cl.
*B60D 1/07* (2006.01)
(52) U.S. Cl. ............... 280/417.1; 280/415.1; 280/416.1; 280/491.5
(58) Field of Classification Search ............... 280/415.1, 280/416.1, 417.1, 441.1, 491.5
See application file for complete search history.

(56) References Cited

U.S. PATENT DOCUMENTS

| | | | | |
|---|---|---|---|---|
| 2,635,892 A * | 4/1953 | Shutter | ............... | 280/489 |
| 3,409,311 A * | 11/1968 | Jack | ............... | 280/415.1 |
| 3,698,740 A * | 10/1972 | Chisholm et al. | ............... | 280/491.4 |
| 4,015,855 A * | 4/1977 | Murray | ............... | 280/416.2 |
| 4,046,274 A * | 9/1977 | Libersky | ............... | 414/485 |
| 4,133,440 A * | 1/1979 | Heidrick, Jr. | ............... | 414/483 |
| 4,426,097 A * | 1/1984 | Livingston | ............... | 280/416.1 |
| 4,433,853 A * | 2/1984 | Swaim | ............... | 280/417.1 |
| 4,623,161 A * | 11/1986 | Sprague | ............... | 280/414.1 |
| 5,566,964 A * | 10/1996 | Leonard | ............... | 280/417.1 |
| 5,895,066 A * | 4/1999 | Headlee | ............... | 280/414.1 |
| 6,213,492 B1 * | 4/2001 | Ceccarelli, III | ............... | 280/491.5 |
| 6,257,167 B1 * | 7/2001 | Joaquim | ............... | 114/344 |
| 6,431,577 B1 * | 8/2002 | Chapman | ............... | 280/491.5 |
| 6,481,737 B2 * | 11/2002 | Dray | ............... | 280/414.1 |
| 6,945,553 B1 * | 9/2005 | Gerres et al. | ............... | 280/511 |
| 7,029,019 B1 * | 4/2006 | Dye | ............... | 280/416.2 |
| 2006/0027997 A1 * | 2/2006 | Grace | ............... | 280/417.1 |
| 2006/0273547 A1 * | 12/2006 | Holtan et al. | ............... | 280/416.1 |

* cited by examiner

*Primary Examiner* — Lesley D Morris
*Assistant Examiner* — Maurice Williams
(74) *Attorney, Agent, or Firm* — Dennis L. Thomte; Thomte Patent Law Office LLC

(57) ABSTRACT

A trailer chassis is described which includes a gooseneck structure at the forward end thereof to which a two-point beam hitch assembly may be secured or a front axle tongue hitch assembly may be secured. The trailer may also function as a fifth wheel hitch.

2 Claims, 6 Drawing Sheets

TRAILER CHASSIS

BACKGROUND OF THE INVENTION

1. Field of the Invention

This invention relates to a trailer chassis and more particularly to a trailer chassis with convertible hitches at the forward end thereof. Even more particularly, the chassis may have a fifth wheel hitch, a two-point hitch or a front axle tongue hitch at the forward end thereof.

2. Description of the Related Art

Many types of trailers and trailer chassis have been previously provided. Some trailers have a fifth wheel hitch at the forward end thereof. Other trailers may have a two-point or a three-point hitch at the forward end thereof while other trailers have a front axle tongue hitch at the forward end thereof. The problem with the prior art trailers is that if the trailer is equipped with a fifth wheel hitch, the user may not have a truck or tractor which has the capability to be used as a fifth wheel prime mover. The same is true for the other types of trailer hitches.

Although some types of trailers have been provided which have the capability of having interchangeable hitches provided at the forward ends thereof, it is not believed that those convertible hitches are convenient to be adapted for use with different hitches on tractors and trucks. Further, it is not believed that the convertible hitches of the prior art are readily adapted to be used as a fifth wheel hitch, a two-point hitch or a front axle tongue hitch.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer or trailer chassis is described which includes an elongated wheeled frame having a rearward end and a forward end. A gooseneck assembly is mounted at the forward end of the wheeled frame with the gooseneck assembly including an upstanding frame portion having upper and lower ends with the lower end thereof being secured to the forward of the wheeled frame. The gooseneck assembly also includes a forwardly extending frame portion, having rearward and forward ends, with the rearward end thereof being secured to the upper end of the upstanding frame portion. The gooseneck assembly also includes a king pin which extends downwardly from the forwardly extending frame portion adjacent the forward end thereof.

The trailer also includes an elongated carrier beam having rearward and forward ends with the carrier beam being selectively removably secured at its rearward end to the wheeled frame at the forward end thereof and which extends forwardly therefrom. A rocker box assembly is pivotally secured to the carrier beam between the rearward and forward ends thereof about a horizontally disposed axis. The rocker box assembly is selectively secured to the king pin. The rocker box assembly is selectively rotatably movable with respect to the king pin between first and second positions.

The trailer also includes a pivot head having a rearward end, a forward end, an upper end and a lower end. The rearward end of the pivot head is pivotally secured to the forward end of the carrier beam about a vertically disposed axis. An elongated horizontally disposed two-point beam is also provided which has first and second ends. The two-point beam is pivotally secured to the pivot head about a horizontally disposed axis which is parallel to the longitudinal axis of the carrier beam and the wheeled frame. The two-point beam has structure thereon for attachment to a prime mover having a two-point hitch thereon.

The trailer also includes a front axle assembly including an elongated front axle having wheels at the ends thereof and a hitch tongue secured to the front axle and extending forwardly therefrom. The front axle assembly is selectively removably secured to the rocker box assembly when the carrier beam, pivot head and the two-point beam have been disconnected from the wheeled frame and the rocker box assembly has been rotated from its first position to its second position.

The trailer is thus able to have a fifth wheel hitch at the forward end thereof, a two-point hitch at the forward end thereof or a front axle tongue hitch at the forward end thereof.

It is therefore a principal object of the invention to provide an improved trailer having a convertible hitch assembly at the forward end thereof.

A further object of the invention is to provide a trailer which may have a fifth wheel hitch, a two-point hitch or a front axle tongue hitch at the forward end thereof.

A further object of the invention is to provide a trailer of the type described which is easily converted so as to have a fifth wheel hitch, two-point hitch or a front axle tongue hitch at the forward end thereof.

A further object of the invention is to provide a trailer of the type described which has the capability of having different hitches at the forward end thereof.

Still another object of the invention is to provide a trailer of the type described which is durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
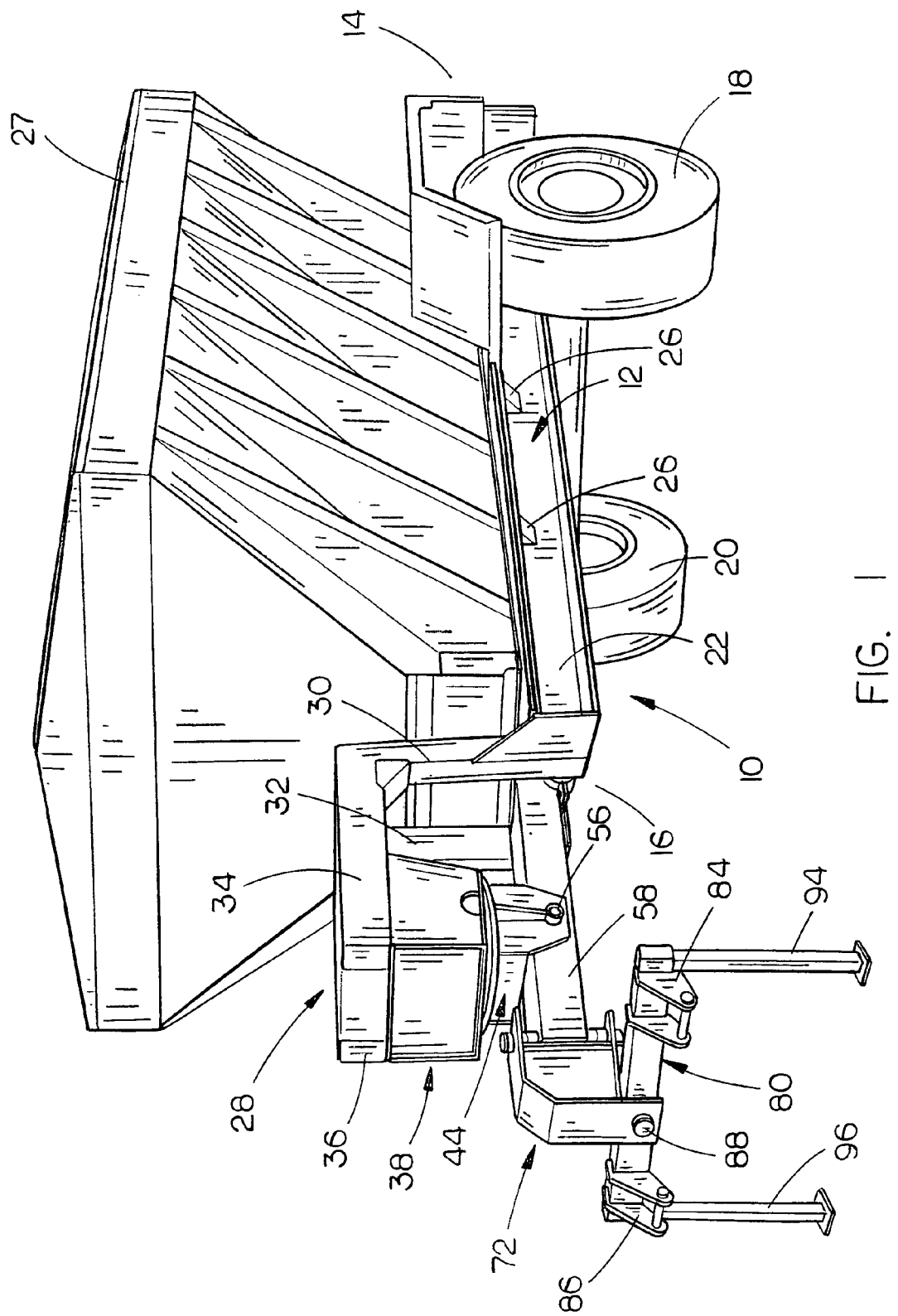
FIG. 1 is a front perspective view of the trailer chassis of this invention when it has a two-point hitch at the forward end thereof and which has a spreader box mounted thereon.
Figure 2:
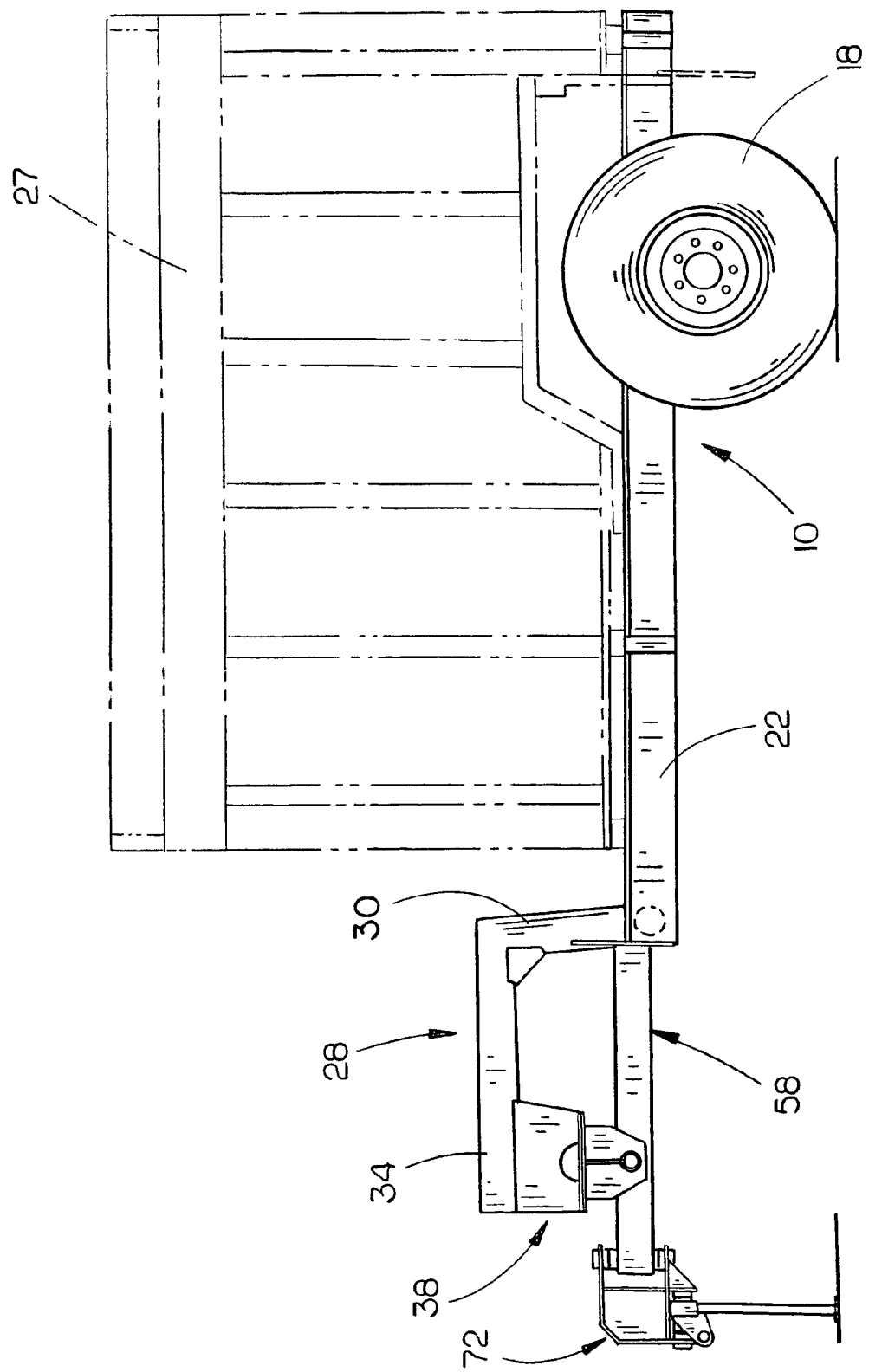
FIG. 2 is side elevational view of the trailer of FIG. 1.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer chassis of this invention is referred to by the reference numeral 10 and includes a wheeled frame 12 having a rearward end 14 and a forward end 16. A pair of wheels 18 and 20 are rotatably mounted on frame 12 in conventional fashion. Normally, frame 12 will have a pair of longitudinally extending frame members 22 and 24 having mounting brackets 26 secured thereto so that a trailer body 27 such as a spreader or the like may be mounted thereon.

Figure 4:
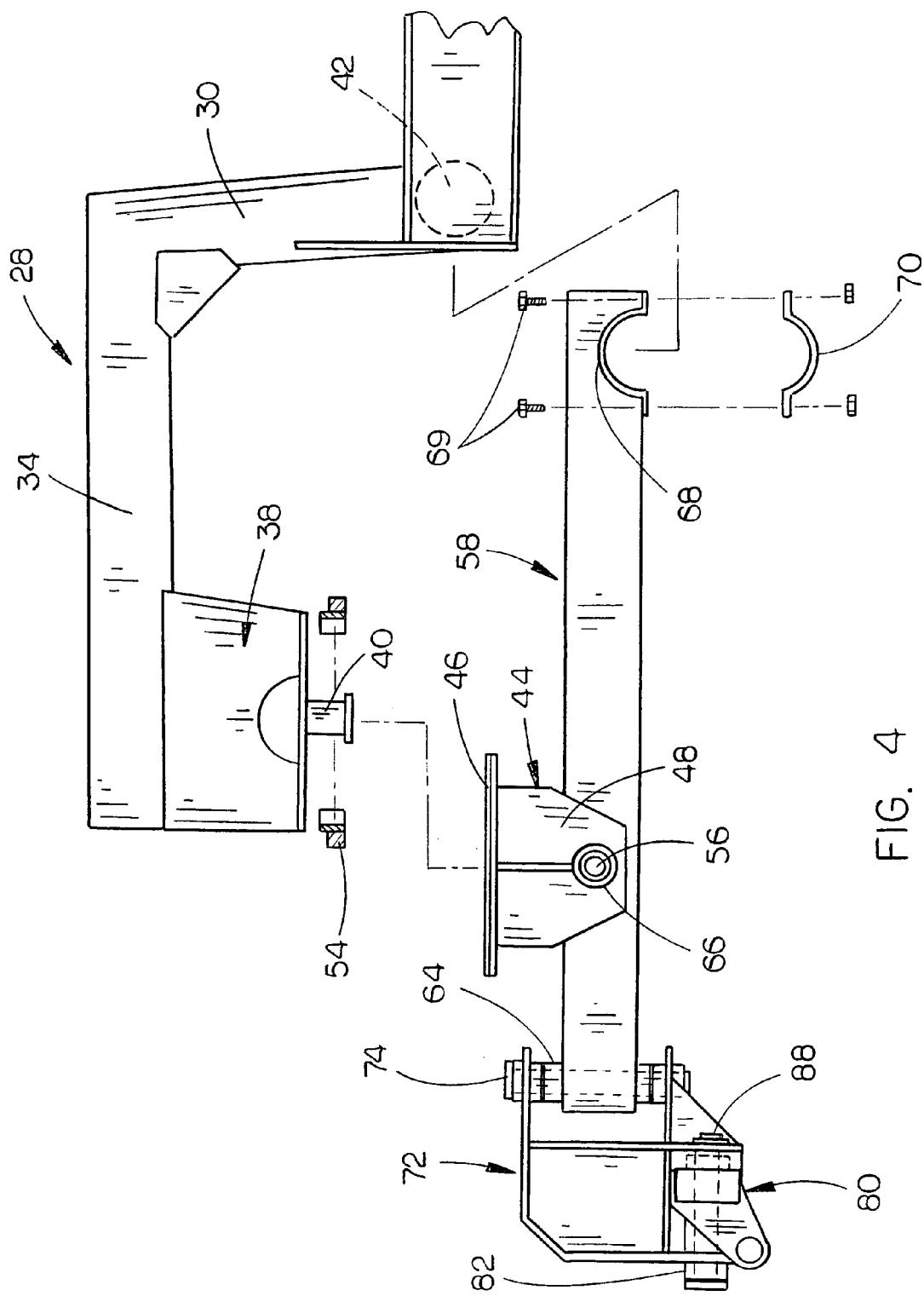
FIG. 4 is a side elevational view illustrating the forward end of the trailer chassis and the components secured thereto.

Frame 12 includes a gooseneck assembly or structure 28 at the forward end thereof. Assembly 28 includes a pair of upstanding frame members 30 and 32 secured to the forward ends of frame members 22 and 24 respectively by welding or the like. Generally horizontally extending frame members 34 and 36 have their rearward ends welded or otherwise secured to the upper ends of frame members 30 and 32 respectively and extend forwardly therefrom. King pin support 38 is secured to the forward ends of frame members 34 and 36 by welding or the like and has a conventional king pin 40 extending downwardly therefrom (FIG. 4). A cylindrical frame member 42 is secured to the forward ends of frame members 22 and 24 and extends therebetween.

The numeral 44 refers to a rocker box assembly having a plate or fifth wheel 46 mounted on the upper ends of leg portions 48 and 50. Plate 46 has a king pin opening 52 formed therein adapted to receive the king pin 40. King pin 40 is locked in the opening 52 by a king pin lock block assembly 54. A pivot pin 56 is selectively positioned in the leg portions 48 and 50 so as to extend therebetween. Rocker box assembly 44 is rotatable with respect to king pin support 38 and king pin 40 as will be described hereinafter.

Figure 3:
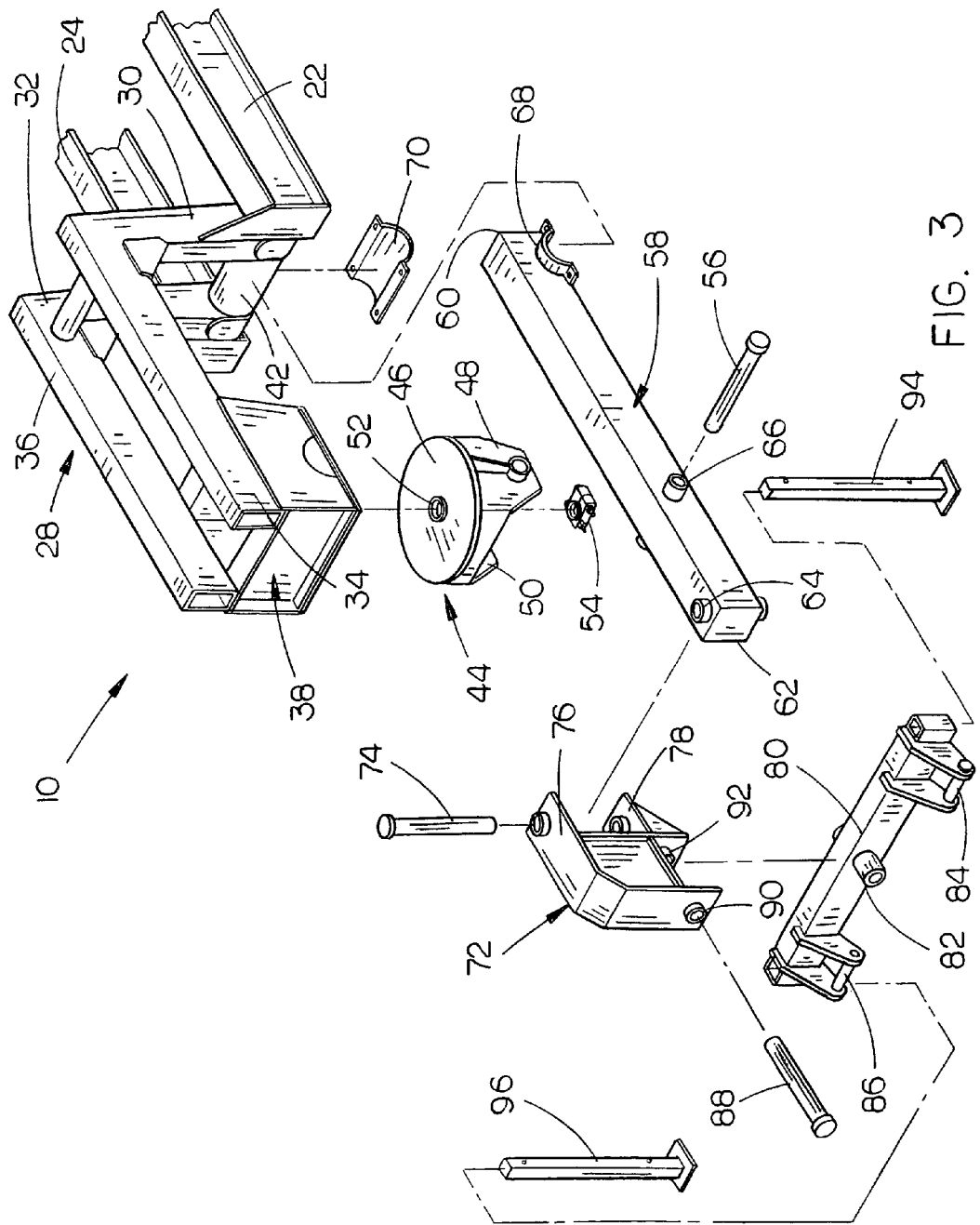
FIG. 3 is a partial exploded perspective view of the trailer chassis and the components mounted at the forward end thereof.

The numeral 58 designates an elongated carrier beam having a rearward end 60 and a forward end 62. The forward end 60 of beam 58 has a vertically disposed sleeve, tube or collar 64 positioned therein and secured thereto. Beam 58 also has a transversely extending and horizontally disposed sleeve, tube or collar 66 positioned therein and secured thereto rearwardly of the forward end thereof. A clamp member 68 is secured to the rearward end of beam 58 as seen in FIG. 3. Carrier beam 58 is selectively removably secured at its rearward end 60 to frame member 42 by positioning clamp member 68 on frame member 42 and then securing clamp member 70 to clamp member 68 by bolts 69 (FIG. 4). Beam 58 is selectively removably secured to rocker box assembly 44 by means of the pivot pin 56 extending through leg portion 48, through sleeve 66 and through leg portion 50 and maintained therein by any convenient means.

A pivot head 72 is pivotally secured to carrier beam 58 about a vertical axis by the pivot pin 74 extending through bracket 76 of pivot head 72, through sleeve 64 in carrier beam 58, and through bracket 78 of pivot head 72.

The numeral 80 refers to an elongated two-point hitch beam having a horizontally extending sleeve, collar or tube 82 positioned at the center length thereof. Forwardly extending brackets 84 and 86 are secured to the opposite ends of beam 80 for connection to a two-point hitch on the prime mover such as a tractor or the like. Pivot head 72 is pivotally secured to beam 80 by a pivot pin 88 extending through collar 90 on pivot head 72, through collar 82 on beam 82, and through collar 92 on pivot head 72. A pair of selectively removable support legs 94 and 96 are selectively vertically secured to beam 80 at the opposite ends thereof, as seen in FIG. 3.

The numeral 98 refers to a front axle tongue hitch assembly which may be utilized. Assembly 98 includes a transversely extending front axle 100 having wheels 102 rotatably mounted on the ends thereof. Axle 100 has a longitudinally extending sleeve, collar or tube 104 mounted thereon which is adapted to receive the pivot pin 56 as will be described hereinafter. A tongue mounting structure 106 is secured to the front axle 100 and extends forwardly therefrom. A hitch tongue 108 is pivotally secured to structure 106 about pivot pins 110 and 112.

If it is desired that the trailer 10 be used with a two-point hitch of a prime mover such as a tractor or truck, the rearward end of carrier beam 58 will be clamped onto the cylindrical frame member 42 and the king pin 40 will be extended downwardly through the opening 52 in rocker box assembly 44 and secured therein by the king pin lock box assembly 54. The rocker box assembly 44, if not previously secured to carrier beam 58, will be pivotally secured to carrier beam 58 by the transversely extending pivot pin 56. Assuming the pivot head 72 and the two-point hitch beam 80 has been previously secured together, the two-point hitch beam 80 may be secured to the two-point hitch of the tractor or truck. For purposes of description, the rocker box assembly 44, as viewed in FIG. 1, will be described as being in its first position relative to the king pin support 38 and the king pin 40.

Figure 5:
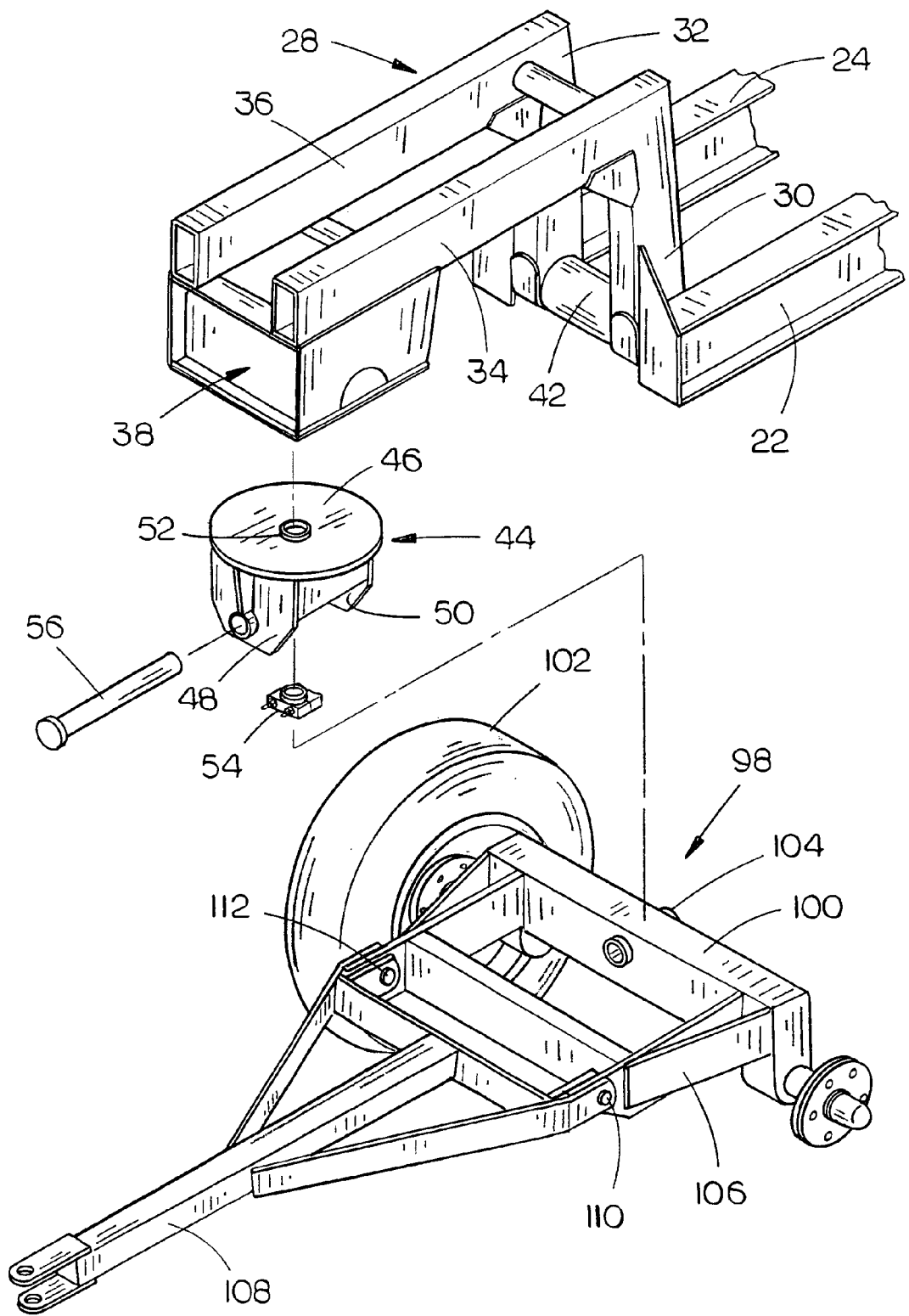
FIG. 5 is an exploded perspective view illustrating the trailer chassis and the front axle tongue hitch which may be secured thereto.
Figure 6:
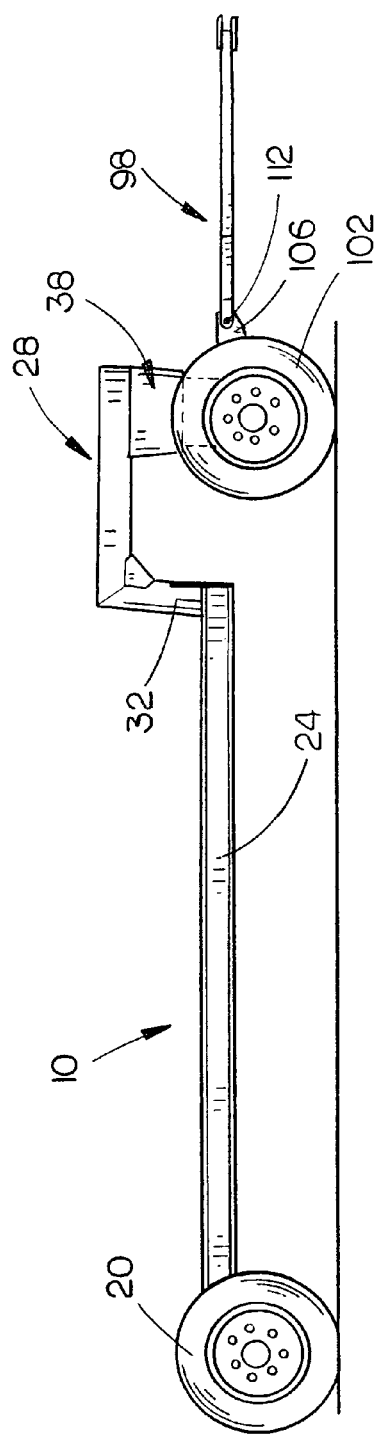
FIG. 6 is a side elevational view of the structure of FIG. 5.
Figure 7:
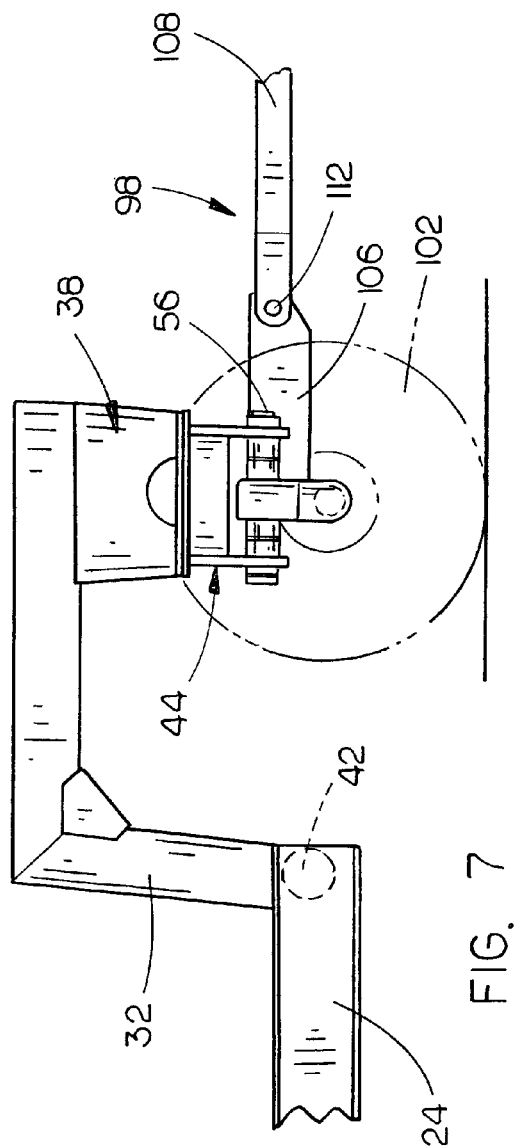
FIG. 7 is a partial side elevational view of the forward portion of the structure of FIG. 6.

If it is desired to have a front axle and tongue mounted on the forward end of the trailer 10, the carrier beam 58 is disconnected from the frame member 42. The pivot pin 56 is then removed from the carrier beam 58 which enables the carrier beam 58, pivot head 72 and the two-point hitch beam 80 to be removed from the trailer. The front axle tongue hitch assembly 98 is then secured to the rocker box assembly 44 as illustrated in FIG. 5. Rocker box 44 is rotated 90° from the position of FIG. 1 to the position of FIG. 5 so that the pivot pin 56 extends parallel to the longitudinal axis of the frame 12. The front axle 100 of the assembly 98 is then secured to the rocker box assembly 44 by extending the pin 56 through leg portion 48, through sleeve 104, and through leg portion 50 and maintained therein by any convenient means.

If it is desired to use a trailer with a fifth wheel prime mover, the rocker box assembly 44 is disconnected from the king pin with neither of the two-point beam hitches nor the front axle tongue hitch assembly 98 being utilized. The king pin 40 may then be inserted downwardly through the fifth wheel of the prime mover to enable the trailer to be pulled by a fifth wheel prime mover.

Thus it can be seen that the trailer or trailer chassis of this invention provides a convenient convertible hitch at the forward end of the trailer which may be either a fifth wheel hitch, a two-point hitch or a front axle tongue hitch. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A trailer chassis comprising:
   an elongated wheeled frame means having a rearward end and a forward end;
   a gooseneck assembly rigidly secured to the forward end of said wheeled frame;

said gooseneck assembly including an upstanding frame portion having upper and lower ends with the lower end thereof being secured to the forward end of said wheeled frame means, a forwardly extending frame portion having rearward and forward ends and upper and lower sides with the rearward end thereof being secured to the upper end of said upstanding frame portion, a king pin support secured to said lower side of said forwardly extending frame portion;

an elongated carrier beam having rearward and forward ends;

said carrier beam being selectively secured at its rearward end to said wheeled frame means at the forward end thereof and extending forwardly therefrom beneath said forwardly extending portion of said gooseneck assembly;

a rocker box assembly having an upper end and a lower end;

said rocker box assembly having a horizontally disposed fifth wheel at its upper end;

said fifth wheel having a king pin receiving opening formed therein;

said rocker box assembly being selectively rotatably secured to said king pin between first and second positions;

said rocker box assembly, when in its said first position, being pivotally and selectively removably secured to said carrier beam between the rearward and forward ends thereof about a horizontally disposed axis which is transverse to the longitudinal axis of said carrier beam;

a pivot head having a forward end, a rearward end, an upper end an a lower end;

said rearward end of said pivot head being pivotally secured to said forward end of said carrier beam about a vertically disposed axis;

an elongated horizontally disposed two-point beam having first and second ends;

said two-point beam being normally disposed transversely to the longitudinal axis of said carrier beam;

said two-point beam being pivotally secured to the lower forward end of said pivot head about a horizontally disposed axis which is parallel to the longitudinal axis of said carrier beam and said wheeled frame means;

said two-point beam having structure thereon for attachment to a prime mover having a two-point hitch thereon.

2. The trailer chassis of claim 1 wherein said king pin may be secured to a fifth wheel structure on a prime mover when said rocker box assembly, said carrier beam, said pivot head and said two-point beam have been disconnected from said wheeled frame means.

* * * * *